W. H. & R. THOMPSON.
ELECTRICALLY OPERATED APPARATUS FOR DISCHARGING LIQUIDS FOR FLUSHING OR OTHER PURPOSES.
APPLICATION FILED FEB. 7, 1910.

978,678.

Patented Dec. 13, 1910.

4 SHEETS—SHEET 1.

WITNESSES:

INVENTORS.

W.H. Thompson & R. Thompson.
by Herbert W. Jenner,
attorney.

W. H. & R. THOMPSON.
ELECTRICALLY OPERATED APPARATUS FOR DISCHARGING LIQUIDS FOR FLUSHING OR OTHER PURPOSES.
APPLICATION FILED FEB. 7, 1910.
978,678.
Patented Dec. 13, 1910.
4 SHEETS—SHEET 2.
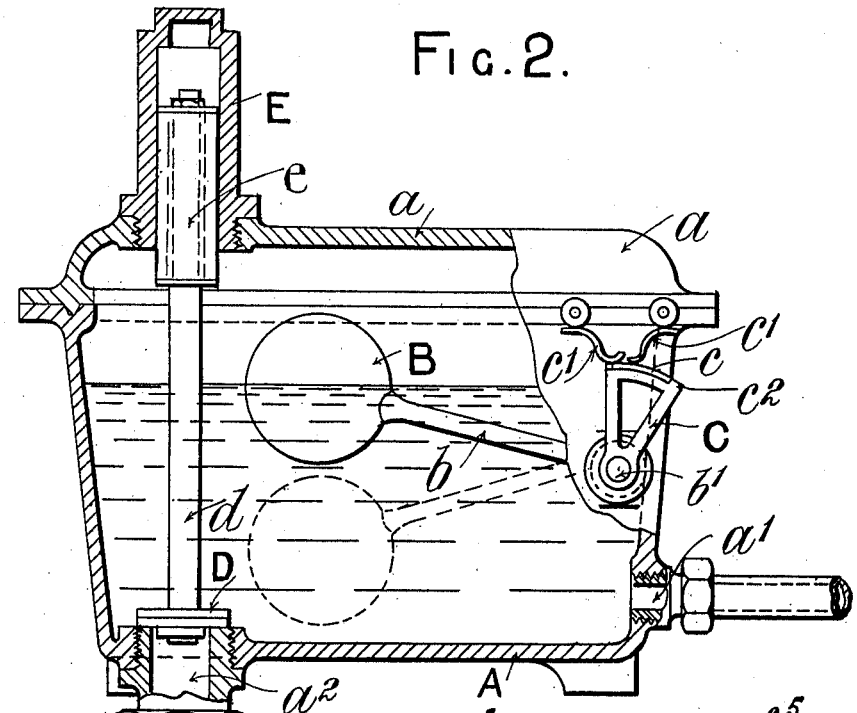
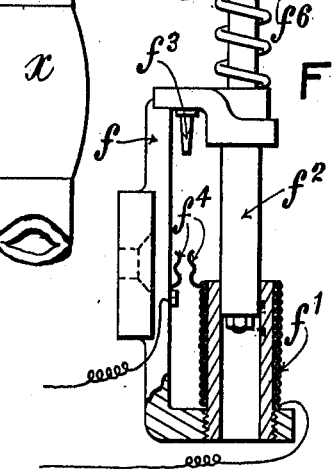
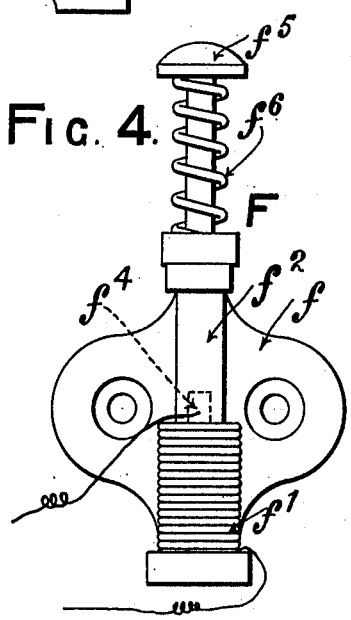
WITNESSES:
Wm H Bates
Chas M Baruch
INVENTORS.
W. H. Thompson & R. Thompson.
by Herbert W. Jenner.
Attorney.

W. H. & R. THOMPSON.
ELECTRICALLY OPERATED APPARATUS FOR DISCHARGING LIQUIDS FOR FLUSHING OR OTHER PURPOSES.
APPLICATION FILED FEB. 7, 1910.

978,678.

Patented Dec. 13, 1910.

4 SHEETS—SHEET 3.

WITNESSES:
Wm H Bates
Chas M Baruch

INVENTORS:
W. H. Thompson & R. Thompson.
by Herbert W. Jenner.
Attorney

W. H. & R. THOMPSON.
ELECTRICALLY OPERATED APPARATUS FOR DISCHARGING LIQUIDS FOR FLUSHING OR OTHER PURPOSES.
APPLICATION FILED FEB. 7, 1910.

978,678.

Patented Dec. 13, 1910.
4 SHEETS—SHEET 4.

UNITED STATES PATENT OFFICE.

WILLIAM HENRY THOMPSON AND ROBERT THOMPSON, OF LONDON, ENGLAND.

ELECTRICALLY-OPERATED APPARATUS FOR DISCHARGING LIQUIDS FOR FLUSHING OR OTHER PURPOSES.

978,678.

Specification of Letters Patent. Patented Dec. 13, 1910.

Application filed February 7, 1910. Serial No. 542,492.

*To all whom it may concern:*

Be it known that we, WILLIAM HENRY THOMPSON and ROBERT THOMPSON, both subjects of the King of Great Britain and Ireland, and residing at 155 Fenchurch street, in the city of London, England, have invented a new and useful Improvement in Electrically - Operated Apparatus for Discharging Liquids for Flushing or other Purposes, of which the following is a specification.

This invention relates to electrically-operated apparatus for discharging liquids for flushing or other purposes, and has for its object the production of apparatus for discharging liquids which can be easily and readily set in operation without the expenditure of manual power, provide a full rapid and powerful discharge, and in which the cistern or receptacle for the liquid is filled and emptied with minimum noise.

Figure 1:
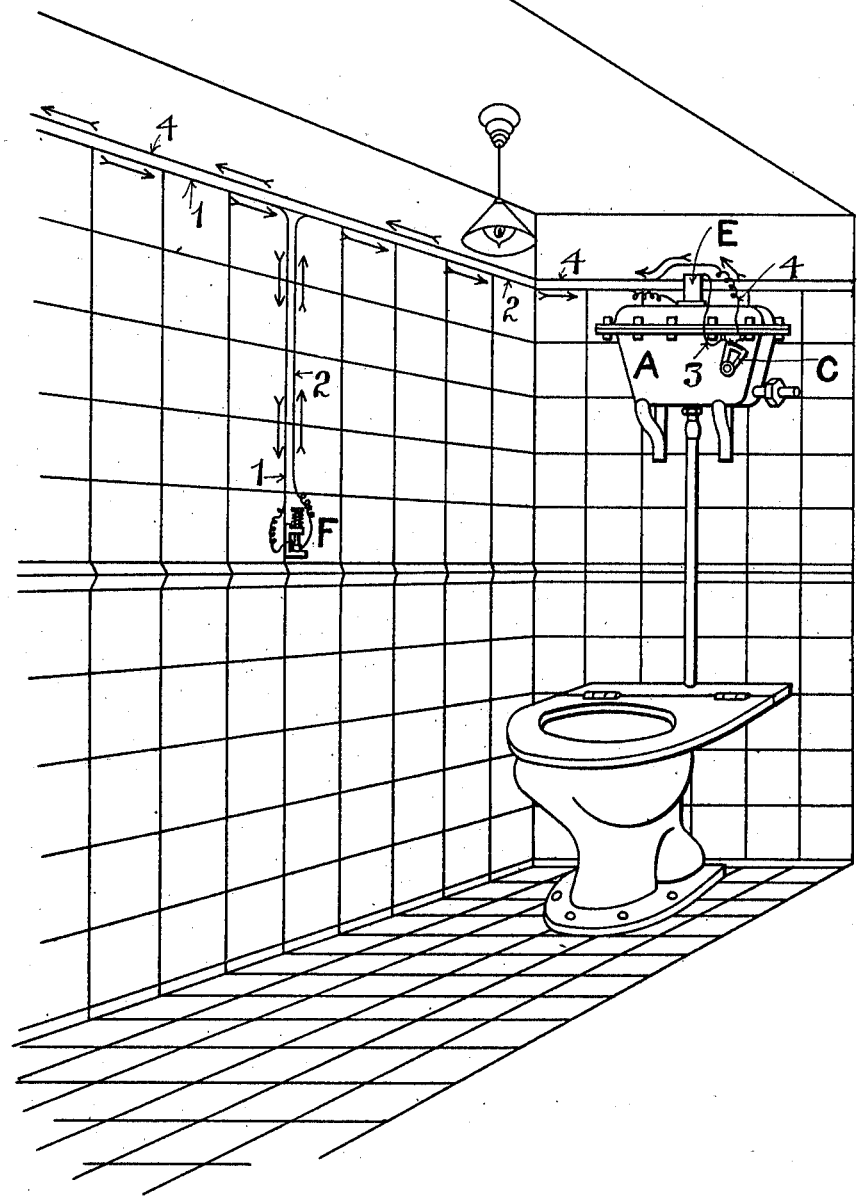
Figure 5:
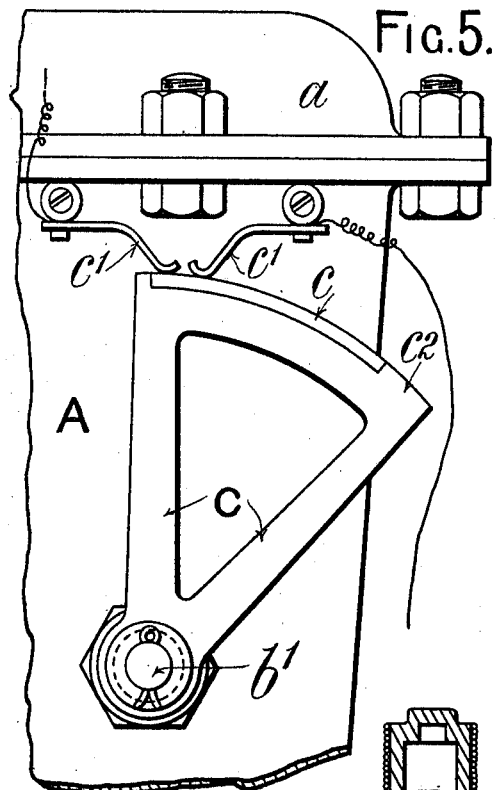
Figure 6:
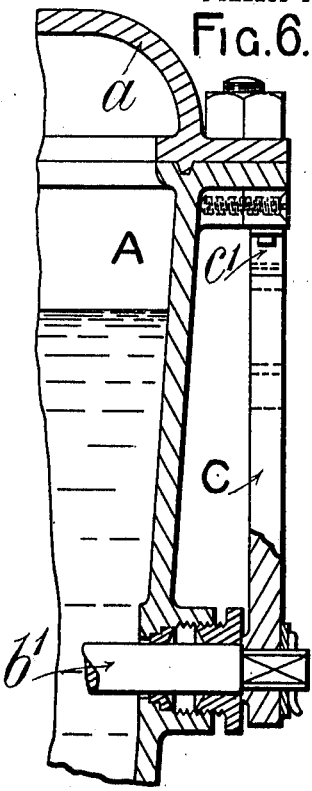
Figure 7:
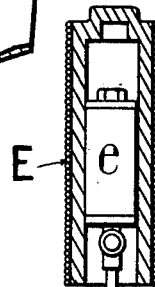
Figure 8:
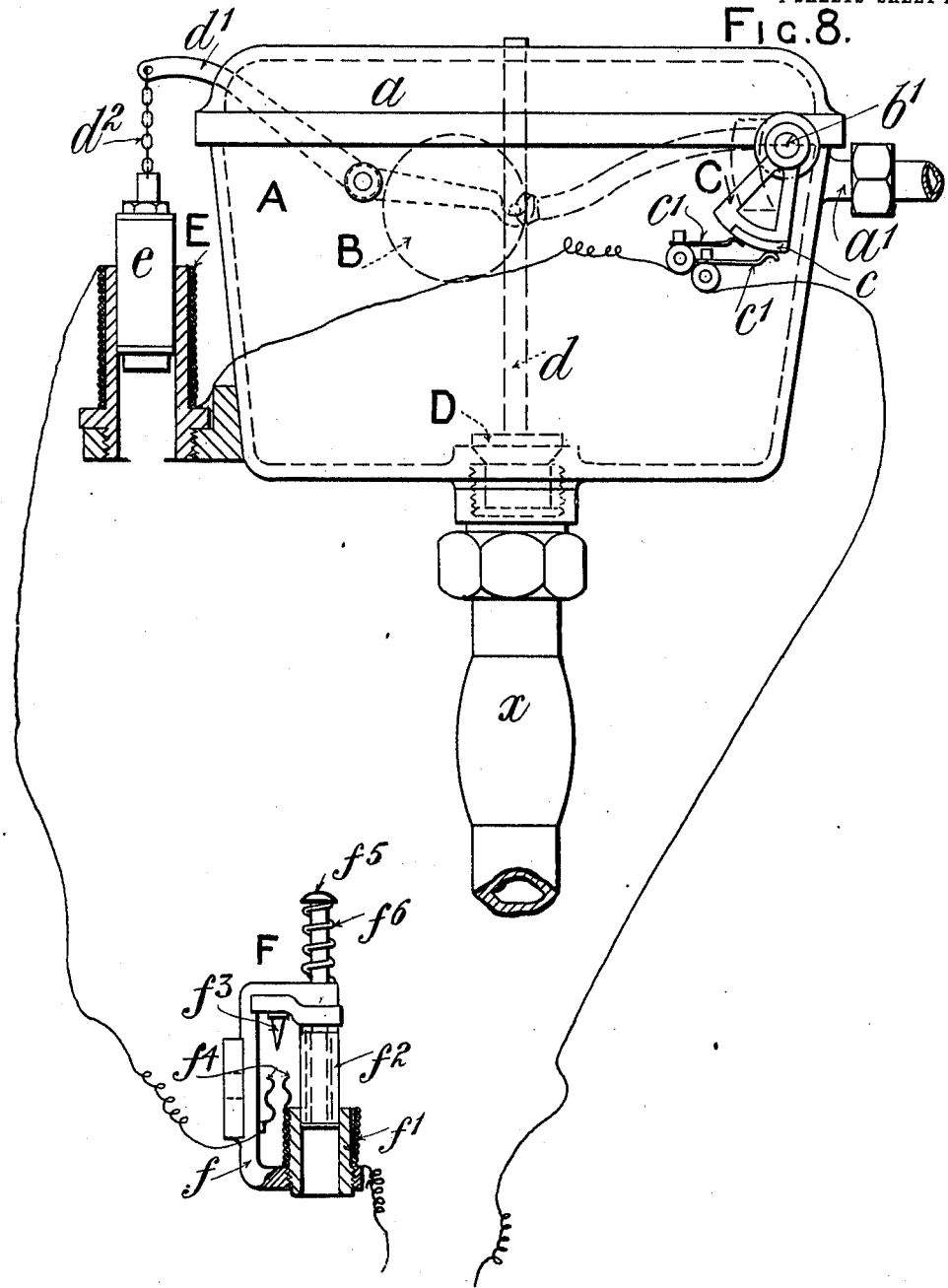

In the accompanying drawings which illustrate some methods of carrying this invention into practice:—Figure 1 is a perspective view showing the general arrangement of an apparatus for flushing purposes. Fig. 2 is a view in side elevation—partly in section—of the cistern or receptacle, Figs. 3 and 4 are views in side and front elevation respectively of the press switch. Fig. 5 is a detail front view of the automatic make-and-break device. Fig. 6 is a side view of the same, showing a part of the cistern in section. Fig. 7 is a side view showing a modification of the means for connecting the solenoid with the valve D. Fig. 8 is a side view partly in section showing a modification of the apparatus.

Throughout the views similar parts are marked with like letters of reference.

The present invention comprises essentially a cistern or receptacle adapted to contain and be filled in any suitable manner with the liquid to be discharged, an outlet from said cistern controlled by a valve operated electrically, a switch arranged in circuit with the means for operating the valve, and a make-and-break device or second switch—also in circuit with the first switch and valve operating means—adapted to be operated by the rise and fall of the liquid within the cistern, the arrangement being such that on establishing an electrical circuit by the switch the said switch keeps the circuit automatically closed and therefore the discharge valve of the cistern open until the latter is emptied when the circuit is automatically broken, thereby closing the said valve and putting the switch into a condition for further operation.

We will now more particularly describe our invention, making reference to the accompanying drawing, in which—

A designates a cistern or receptacle having arranged therein a float B attached to the radiating or moving end of a lever $b$ fixed to or connected with a spindle $b^1$ mounted in bearings formed in the sides of the cistern A so that the said spindle $b^1$ may form an axis on which the float lever $b$ radiates. One end of the spindle $b^1$ projects through the side of the cistern so that it may receive and operate a quadrant C. This quadrant C is provided with an insulated strip $c$ of metal or other good conductor adapted to form a rubbing contact surface for spring contact fingers $c^1$ conveniently carried by the side of said cistern A, the arrangement being such that the said strip $c$ keeps said contact fingers in electrical connection with one another at all such times as the float B is supported by the water in the cistern but when the cistern is empty the electrical contact between said contact fingers is broken by reason of one of them contacting an insulated part $c^2$ beyond the said strip $c$. The cistern A is provided with a suitable cover $a$ so that it may be sealed and made air-tight and is also furnished with a suitably located inlet $a^1$ and an outlet $a^2$ at or near the bottom and in some cases may be provided with a shifting or other suitable valve. The outlet $a^2$ is arranged to be closed by a suitable valve D capable of operation for retaining the water in the cistern A or controlling its outflow as hereinafter mentioned.

The valve D is carried by the one end of a valve spindle $d$ whose opposite or upper end carries a core or armature $e$ for a solenoid or electro-magnet E carried by the cover $a$ of the cistern. The solenoid or electro-magnet E is so arranged in relation to its core or armature $e$ that when in circuit with a suitable source of electric current the valve D is lifted off its seating so as to open the outlet $a^2$ and allow the water contained in the cistern A to discharge through a pipe $x$ in connection with the said outlet $a^2$.

The current by which the solenoid or electro-magnet E is influenced is controlled by a press switch F (see more particularly Figs. 3, 4 and 5). This switch comprises a bracket $f$ adapted to be secured to a wall or other convenient place and carrying a solenoid or electro-magnet coil $f^1$, the core or armature $f^2$ of which is in the form of a plunger working through a bearing in the bracket $f$. To the upper part of said plunger is fixed a collar carrying a contact stud $f^3$ adapted to pass down between and establish contact with spring fingers $f^4$. The plunger is depressed by means of a press knob $f^5$ on its upper end against a suitably arranged compression spring $f^6$, which spring returns the plunger to its normal condition when not held down by the solenoid or electro-magnet coil $f^1$ under excitation.

The electrical connections between the various parts are as follows:—From the one pole of a suitable source of power a lead 1 is taken to one of the spring contact fingers $f^4$ of the switch F and when the stud $f^3$ is in contact with both said fingers $f^4$ the current traverses the coil $f^1$ and is then led by a lead 2 to the coil of the valve solenoid E. From the solenoid E a lead 3 is taken to one of the spring fingers $c^1$ of the quadrant C and the other spring finger $c^1$ is by a lead 4 connected to the other pole of the source of power. It will be understood that the various parts in electrical connection are insulated where requisite to insure the current taking the path above described. It will thus be seen that on depressing the knob $f^5$ of the switch F a circuit is established causing the valve D to be opened to discharge the water in the cistern A. This circuit as before described is not again broken until the cistern is emptied, whereupon the circuit being broken the valve D closes and the plunger of the switch F rises under the influence of the spring $f^6$ ready for further operation. When the cistern A is properly sealed the water is discharged with a force according to the pressure of water acting on the volume of air accumulated in the upper part of it. The action and power of the valve solenoid E may be transmitted to the valve D by means of a lever or system of levers G (as illustrated on Fig. 7) and links connecting the solenoid core $e$ with the valve spindle $d$ so as to multiply the force of the solenoid in its action on the valve D.

In the modification illustrated on Fig. 8 the cistern A is supplied with water by the usual float feed valve and the stem $d$ of the discharge valve D is operated by a lever $d^1$ fulcrumed within the cistern and connected by its one end to the free end of the stem $d$. The other end of said lever $d^1$ is brought outside the cistern and there connected by means of a chain or link $d^2$ with the core or armature $e$ of the solenoid E. The other parts and connections to which no reference is made are arranged as before described or modified as required.

The mechanism may be further varied or adapted or other known device or devices may be used to operate in connection with it for automatically making and breaking the circuit and we may apply other known forms and arrangements of electro-magnets that may be suitable in substitution for either or both of the solenoids hereinbefore mentioned.

The herein-described arrangement and combination of electrical or electro-magnetic apparatus and parts forming our invention may be adapted and applied to the valves or mechanism of various apparatus for discharging or flushing water or other fluid.

What we claim as our invention and desire to secure by Letters Patent is:—

1. The combination, with a cistern provided with an outlet, of a valve controlling the said outlet, an electric device for opening the said valve, a switch arranged in circuit with the said electric device, and a make-and-break device also included in the circuit and operated automatically by the rise and fall of the liquid in the cistern, the circuit being broken when the liquid falls, thereby permitting the valve to close.

2. The combination, with an air-tight cistern provided with an outlet and adapted to hold the liquid to be discharged under pneumatic pressure, of a valve controlling the said outlet, an electric device for opening the said valve, a switch arranged in circuit with the said electric device, and a make-and-break device also included in the circuit and operated automatically by the rise and fall of the liquid in the cistern, the circuit being broken when the liquid falls, thereby permitting the valve to close.

3. The combination, with a cistern provided with an outlet, of a valve controlling the said outlet, an electric device for operating the said valve, a switch arranged in circuit with the said electric device, a make-and-break device also included in the circuit, and a float arranged in the cistern and operatively connected with the make-and-break device, the circuit being broken on the descent of the float, thereby permitting the valve to close.

4. The combination, with a cistern provided with an outlet, of a valve controlling the said outlet, a solenoid for operating the said valve, a switch arranged in circuit with the said solenoid, and a make-and-break device also included in the circuit and operated automatically by the rise and fall of the liquid in the cistern, the circuit being broken when the liquid falls, thereby permitting the valve to close.

5. The combination, with a cistern provided with an outlet, of a valve controlling the said outlet, a solenoid, lever mechanism operatively connecting the solenoid with the valve, a switch arranged in circuit with the said solenoid, and a make-and-break device also included in the circuit and operated automatically by the rise and fall of the liquid in the cistern, the circuit being broken when the liquid falls, thereby permitting the valve to close.

In testimony whereof we affix our signatures in presence of two witnesses.

WILLIAM HENRY THOMPSON.
ROBERT THOMPSON.

Witnesses:
PHILIP D. WINSTANLEY,
JOHN STRATHORN.